United States Patent
Wang et al.

(10) Patent No.: US 7,490,129 B2
(45) Date of Patent: *Feb. 10, 2009

(54) METHODS AND APPARATUS FOR TRANSMITTING PRIORITIZED ELECTRONIC MAIL MESSAGES

(75) Inventors: David Shan-Ming Wang, Fremont, CA (US); P. Robert Hsu, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 456 days.

This patent is subject to a terminal disclaimer.

(21) Appl. No.: 10/988,276

(22) Filed: Nov. 12, 2004

(65) Prior Publication Data

US 2005/0091326 A1    Apr. 28, 2005

Related U.S. Application Data

(63) Continuation of application No. 10/164,110, filed on Jun. 4, 2002, now Pat. No. 6,820,113, which is a continuation of application No. 09/241,201, filed on Feb. 1, 1999, now Pat. No. 6,442,593.

(51) Int. Cl.
*G06F 15/16* (2006.01)

(52) U.S. Cl. ........................... 709/206; 709/207

(58) Field of Classification Search ............ 709/206, 709/207
See application file for complete search history.

(56) References Cited

U.S. PATENT DOCUMENTS

| | | | |
|---|---|---|---|
| 5,153,905 A | 10/1992 | Bergeron et al. | |
| 5,377,354 A | 12/1994 | Scannell et al. | |
| 5,493,692 A | 2/1996 | Theimer et al. | |
| 5,509,000 A | 4/1996 | Oberlander | |
| 5,673,256 A | 9/1997 | Maine | |
| 5,675,732 A | 10/1997 | Majeti et al. | |
| 5,694,616 A | 12/1997 | Johnson et al. | |
| 5,699,528 A | 12/1997 | Hogan | |
| 5,878,230 A | 3/1999 | Weber et al. | |
| 5,903,735 A | 5/1999 | Kidder et al. | |
| 5,930,759 A | 7/1999 | Moore et al. | |
| 6,078,907 A | 6/2000 | Lamm | |
| 6,078,919 A | 6/2000 | Ginzburg et al. | |
| 6,078,961 A | 6/2000 | Mourad et al. | |
| 6,084,858 A | 7/2000 | Matthews et al. | |
| 6,108,688 A | 8/2000 | Nielsen | |
| 6,185,603 B1 | 2/2001 | Henderson et al. | |

(Continued)

FOREIGN PATENT DOCUMENTS

EP    0 772 327 A2    5/1997

(Continued)

*Primary Examiner*—Krisna Lim
(74) *Attorney, Agent, or Firm*—Finnegan, Henderson, Farabow, Garrett & Dunner LLP (57) ABSTRACT

A system allows users to send electronic mail messages having prioritized delivery. A server receives an electronic mail message that contains a specified priority or a specified time frame for delivery. The server determines a time frame for delivery and selects procedures to ensure delivery of the electronic mail message within the determined time frame. The server then provides the electronic mail message to the receiving account within the determined time frame.

20 Claims, 7 Drawing Sheets

U.S. PATENT DOCUMENTS

| | | |
|---|---|---|
| 6,189,027 B1 | 2/2001 | Haneda et al. |
| 6,216,104 B1 | 4/2001 | Moshfeghi et al. |
| 6,285,991 B1 | 9/2001 | Powar |
| 6,289,322 B1 | 9/2001 | Kitchen et al. |
| 6,292,834 B1 | 9/2001 | Ravi et al. |

FOREIGN PATENT DOCUMENTS

| | | |
|---|---|---|
| WO | WO98/13993 | 4/1998 |

METHODS AND APPARATUS FOR TRANSMITTING PRIORITIZED ELECTRONIC MAIL MESSAGES

This application is a continuation of application Ser. No. 10/164,110, filed Jun. 4, 2002, now U.S. Pat. No. 6,820,113, which is a continuation of application Ser. No. 09/241,201, filed Feb. 1, 1999, now U.S. Pat. No. 6,442,593, both of which are incorporated herein by reference.

BACKGROUND OF THE INVENTION

A. Field of the Invention

This invention generally relates to electronic mail systems and, more particularly, to methods and apparatus for prioritized delivery of electronic mail messages.

B. Description of the Related Art

The past several years have seen a dramatic shift in methods of communicating information. In the past, the only way of communicating information was via standard mail delivery of handwritten or typed documents. With the advent of the telephone and telegraph, it became possible to convey voice signals and information electrically. Recently, electronic communication has become a rapidly increasing way of conveying information—especially because of widely available access to the Internet. People now exchange electronic mail ("email") addresses concurrently with telephone numbers, and many major businesses provide access to information and services on the Internet via sites on the World Wide Web.

Because of the rapid pace of development in this field, however, the evolution has not been completely seamless. Although it is now possible to communicate audio/visual information electronically, it is certainly not easy to do so. Simply to send and receive email, a user initially must purchase a computer system, configure all of its component parts to interoperate, learn the operating system for the computer, contract with an Internet service provider, and learn how to use the application software for email. If a user wants to send audio-visual information such as a picture, video sequence or audio, the user is forced to purchase even more hardware and learn even more software.

Figure 1:
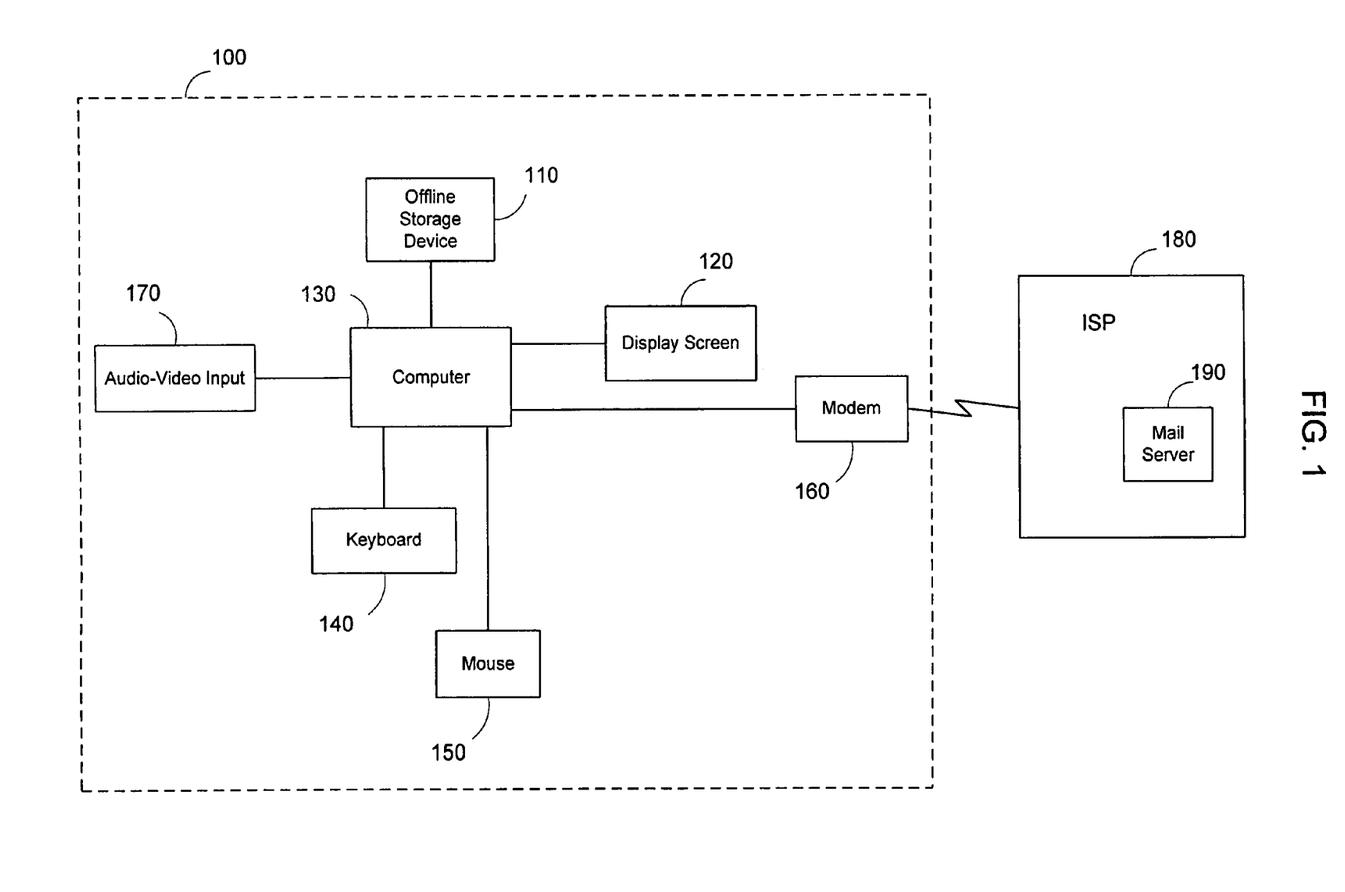
FIG. 1 is a block diagram of a conventional computer system for electronic communication.

A conventional computer system is shown in FIG. 1. A computer system 100 is used to compose and transmit email, generally by dial-up telephone connection, to an Internet service provider (ISP) 180. ISP 180 contains a mail server 190, which is responsible for receiving email and routing it to the appropriate destination address.

Computer system 100 consists of a computer 130, to which are attached several accessories. Computer 130 may be any conventional home or business computer such as a personal computer (PC), a Macintosh, a network computer, or a Sun Workstation. The user interface to computer 130 includes a keyboard 140, some type of pointing device such as a mouse 150, and a display screen 120. In addition to a user interface, computer system 100 may also contain an offline storage device 110 for storing messages to be sent and messages that have been received. Typical offline storage devices include a hard disk drive, a floppy disk drive, or a tape unit. A typical computer system 100 also contains a modem 160 which is employed to send or receive messages between computer system 100 and ISP 180.

To send a email message, a user enters a message into computer 130 via keyboard 140 and/or mouse 150. This email message may or may not then be stored on offline storage device 110. The email message is then transmitted from computer 130 to ISP 180 via modem 160. Upon receiving the message, mail server 190, within ISP 180, forwards the message to the appropriate destination. In this manner, a user of computer system 100 may transmit a email message to any user that is connected to ISP 180, either directly or indirectly via the Internet.

A user desiring to transmit an email message containing audio-visual information must further employ an audio-video input interface 170. To this interface 170 a user may attach an audio-visual source such as, for example, a video cassette recorder (VCR) or a camcorder. To transmit an audio-visual email message, audio-visual information is transferred from the audio-visual source to computer 130 via interface 170, and converted to an appropriate format such as MPEG. This information may or may not be stored offline on storage device 110. The information is then composed into an email message and is transmitted from computer 130 to ISP 180 via modem 160. Mail server 190 of ISP 180 forwards it to the appropriate destination.

As the preceding explanation demonstrates, composing and transmitting an email message on a conventional computer system requires numerous hardware components and significant user sophistication. This complexity creates a barrier to entry that prevents many individuals from participating in the information age.

Recent developments have sought to address the problem noted above. Companies now provide a service that allows an individual to purchase a relatively inexpensive "set-top box," which is connected to a television receiver to access the Internet. As a result, individuals now have somewhat easier access to the Internet and a simpler way of sending and receiving email.

Figure 2:
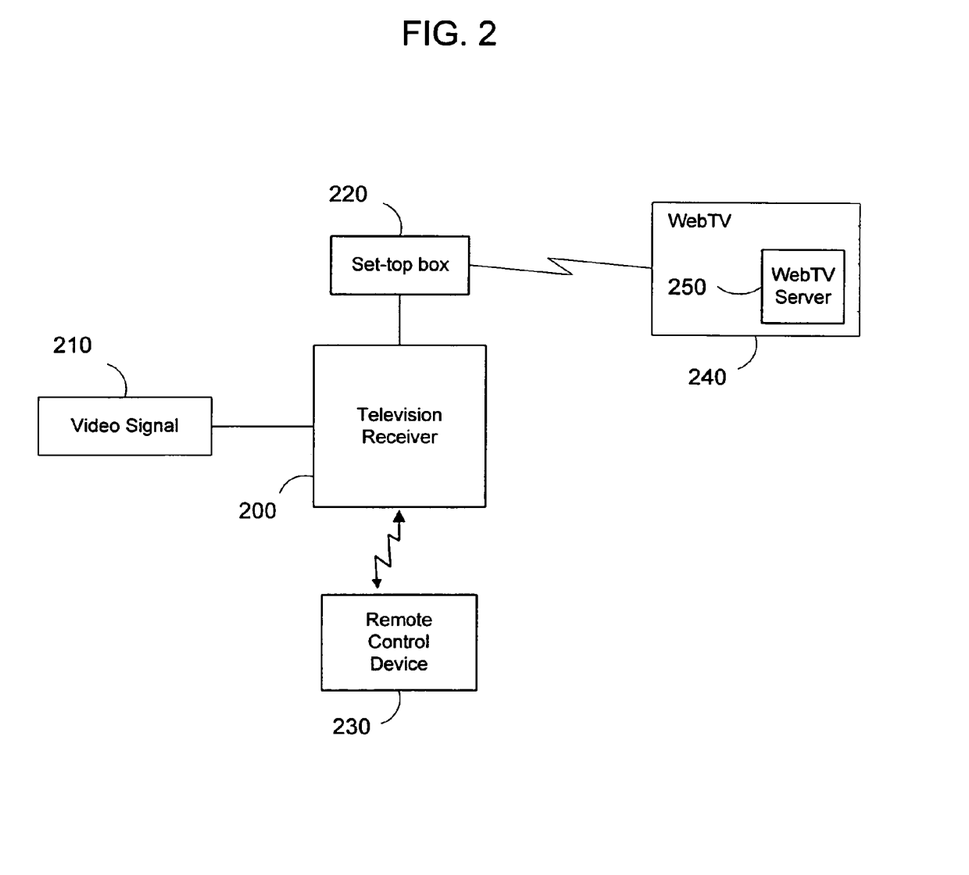
FIG. 2 is a block diagram of a conventional set-top system for electronic communication.

A representative example of such a set-top system is shown in FIG. 2, and is commercially available from WebTV. Such a system consists of a set-top box 220 which is connected to a conventional television receiver 200. Also attached to television receiver 200 may be a video signal source 210 such as, for example, a VCR or a camcorder.

A user of such a system may compose a email message by using remote control 230 in conjunction with set-top box 220. This may be accomplished by using a wireless keyboard (not shown). Alternatively, set-top box 220 may generate a display of the alphabet, which is shown on television receiver 200. By employing remote control 230, the user selects individual letters of the displayed alphabet to compose words, phrases, or sentences. During this composition, the email message being created is stored in a memory of set-top box 220. Once the message has been fully created, it is transmitted from set-top box 220 to a WebTV system 240. This transmission is performed using a conventional modem and dial-up telephone lines. Once the message reaches WebTV system 240, a WebTV mail server 250 forwards the message to the appropriate destination.

Problems remain, however, despite the availability of such set-top systems. Neither a set-top system nor a computer system contains a robust email management system designed with home users in mind. For example, although these systems provide a way to send and receive text information, they do not allow the user to manipulate audio-visual information. Moreover, neither the computer system nor the set-top system provides users with the ability to specify a priority or a delivery time frame for transmitted email messages. For example, a user cannot specify that a message must be delivered within one hour.

There exists, therefore, a need for a versatile but simple form of electronic communication that is readily accessible to the general public. To provide versatility, the system should accommodate text, audio, video, and a robust email system; it should also employ an open architecture so that individuals may use whatever Internet service provider they prefer. To provide simplicity, the system should be integrated, rather than having multiple components that its user needs to purchase separately and then assemble together; it should also employ familiar hardware that requires simple commands.

The present invention helps to satisfy this need and solve the problem of providing a simple but versatile form of electronic communication. It provides methods and apparatus that allow its users to manipulate, send, and receive audio/visual information easily by using familiar devices such as an interactive receiver and a remote control device. In particular, the present invention is directed to methods and apparatus for prioritized delivery of electronic mail messages.

SUMMARY OF THE INVENTION

Consistent with the invention, one method for providing prioritized delivery of an email message comprises receiving an indication of a delivery time frame for the email message. Based on the indicated delivery time frame, the method also includes determining a time frame for delivery of the email message and selecting procedures sufficient for delivering the email message within the determined time frame.

Consistent with the invention, another method for providing prioritized delivery of an email message comprises generating an email message at a sending account on an interactive receiver and assigning a priority level to the email message. The method includes transmitting both the email message and a priority tag associated with the message from the interactive receiver to a mail server. The method also includes determining a time frame for delivery of the email message based on a priority level contained within the email message, selecting a data path that has sufficient bandwidth to ensure delivery of the email message within the determined time frame, and providing the email message to the receiving account within the specified time frame.

Although these methods have been described here as examples, one skilled in the art will recognize that there exist other methods and apparatus that are consistent with the claimed invention.

BRIEF DESCRIPTION OF THE DRAWINGS

The accompanying drawings, which are incorporated in and constitute a part of this specification, illustrate the invention and, together with the description, serve to explain the principles of the invention.

The accompanying drawings, which are incorporated in and constitute a part of this specification, illustrate the invention and, together with the description, serve to explain the principles of the invention.

DESCRIPTION OF THE PREFERRED EMBODIMENTS

Reference will now be made in detail to an implementation of the present invention as illustrated in the accompanying drawings. Wherever possible, the same reference numbers will be used throughout the drawings and the following description to refer to the same or like parts.

A. Overview

Systems consistent with the claimed invention overcome the limitations associated with the computer and set-top systems and provide a simple yet versatile way to employ a prioritized delivery system for email. A sender uses an interactive receiver to compose an email message containing text, audio, video data, or any combination thereof. The sender indicates a delivery time frame for the email message. For example, the sender may designate the email message as high priority, regular priority, or low priority. Alternatively, the sender may specify a time frame within which the email message must be delivered.

In a preferred implementation, if the email message is of the highest priority (or the shortest time frame), both the email message and an associated priority tag are transmitted to a proprietary mail server using the fastest connection possible. The mail server processes the email message promptly and provides it to the receiving account using the fastest connection possible.

If the email message is of any lower priority, preferably only a priority tag is transmitted to the mail server using the fastest connection possible. Based on the indicated delivery time frame (and other factors including available data paths and the activity levels), the mail server obtains, processes, and provides the email message to the receiving account.

For each email message to be delivered, the mail server preferably records billing information based on the indicated delivery time frame for the message.

B. System Diagrams

Figure 3:
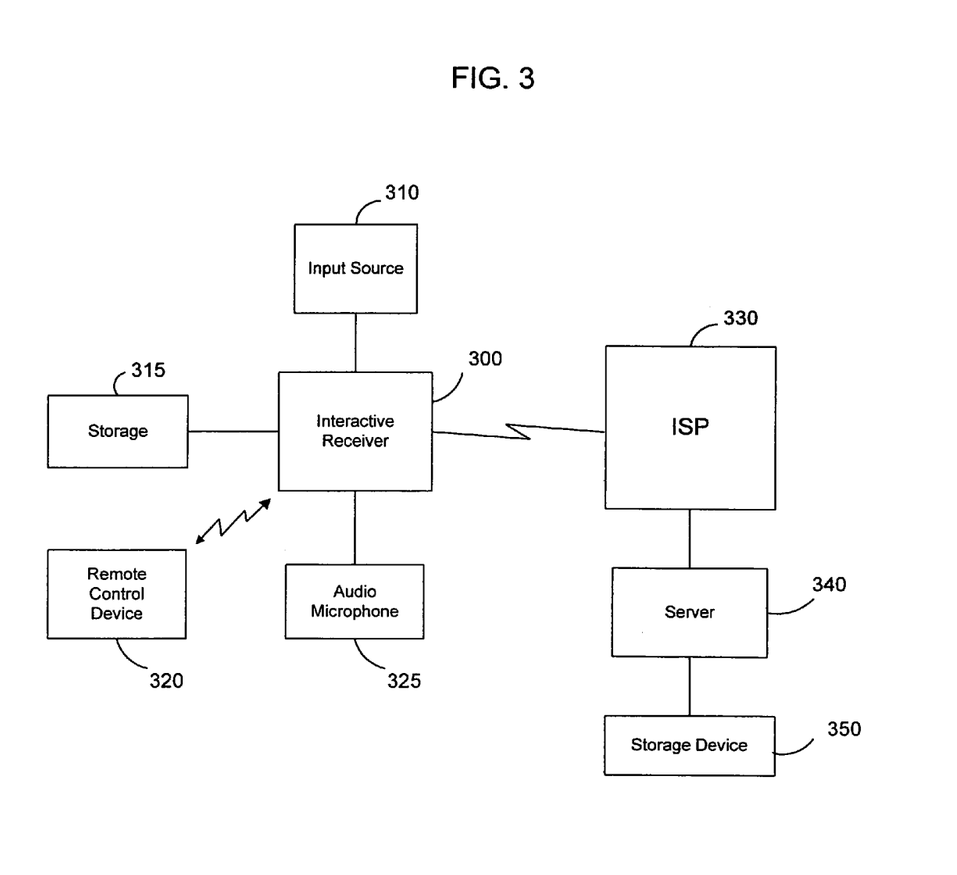
FIG. 3 is a block diagram of a system, consistent with the claimed invention, for certified email.

One example of a system for prioritized delivery of email messages is shown in FIG. 3. This system consists of an interactive receiver 300 and ISP 330, each of which has other components interfaced to it. In a preferred embodiment, interactive receiver 300 is similar to a conventional television receiver, with additional features as described below. Connected to interactive receiver 300 are an input source 310, a storage 315, a remote control device 320, and an audio microphone 325. Examples of input source 310 include, but are not limited to, a VCR, a digital still camera, or a camcorder. Examples of storage device 315 include, but are not limited to, a hard disk drive, a digital video drive, an analog tape drive, or a random access memory. Examples of remote control device 320 include, but are not limited to, a television remote control device, or a conventional QWERTY keyboard.

The system also contains a server 340 that is connected to ISP 330. Attached to server 340 is a storage device 350, examples of which include a hard disk, an analog tape drive, or a random access memory. Server 340 is a conventional network mail server computer but contains the software and hardware necessary to manage a system consistent with the claimed invention. This includes, for example, software to determine the time frame within which an email message is to be delivered or software to select a data path that has sufficient bandwidth to ensure delivery within a specified time frame.

The system shown in FIG. 3 allows the user to simply compose and transmit email messages having differing delivery time requirements. Moreover, as the system shown in FIG. 3 also demonstrates, a user of such a system is not limited to a specific ISP, as is the case with conventional systems. Any ISP that chooses to use proprietary server 340 may provide its users with this system's capabilities. This open architecture approach provides significant flexibility to users, who may select any ISP of their liking, so long as that ISP supports this system.

Although FIG. 3 shows one example of a system that allows a user to compose and transmit prioritized email messages, those skilled in the art will recognize that there exist other systems that are also consistent with the claimed invention. For example, although FIG. 3 shows server 340 and storage device 350 as being separate from ISP 330, any number of these components may be combined.

Figure 4:
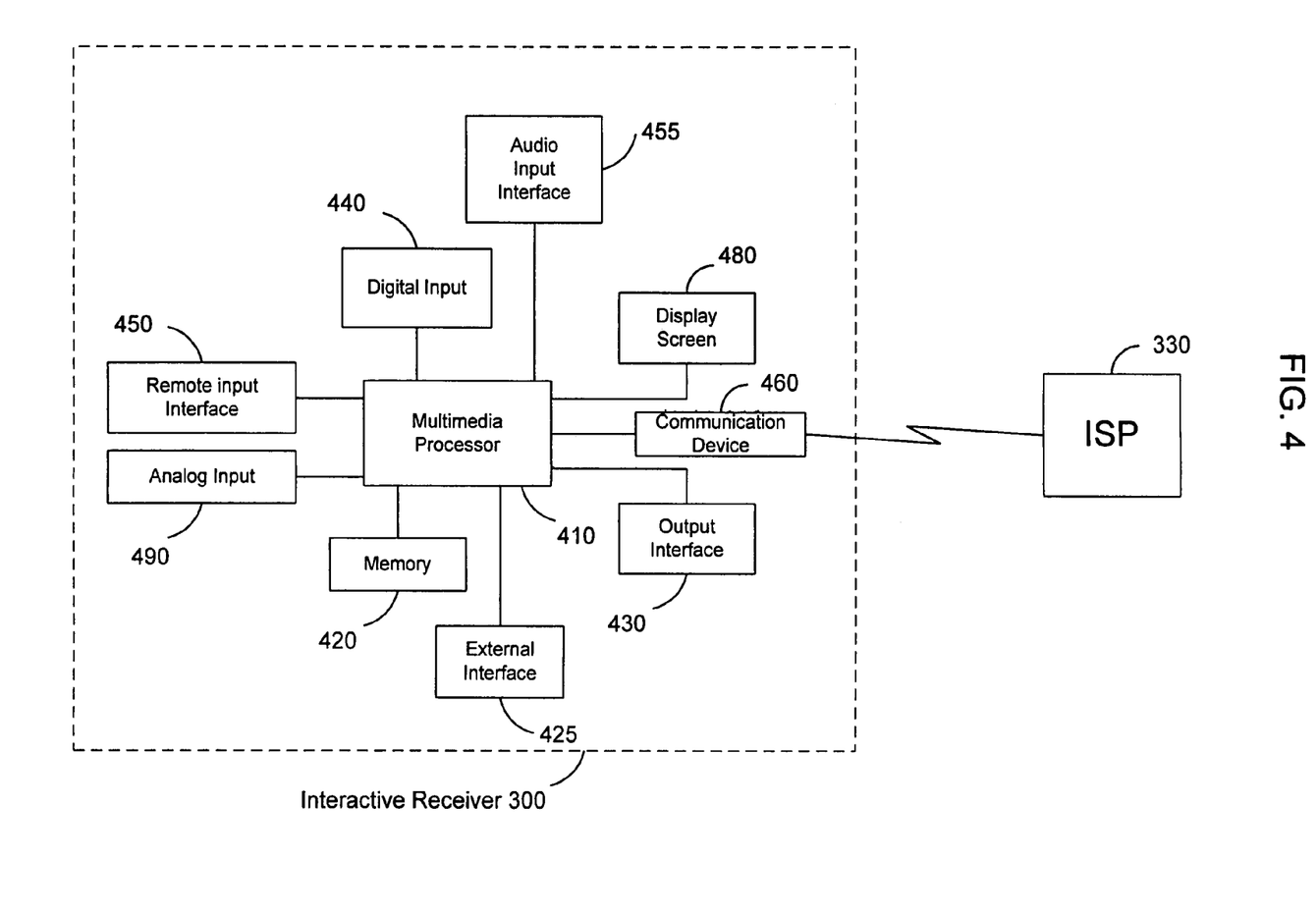
FIG. 4 is a block diagram, consistent with the claimed invention, of an interactive receiver.

FIG. 4 shows a block diagram, consistent with the claimed invention, of the portion of the system responsible for composing a prioritized email message, namely, interactive receiver 300. Interactive receiver 300 shown in this diagram contains a multimedia processor 410, examples of which include the Pentium MMX™ processor commercially available from Intel Corporation and the Tri-media™ processor commercially available from Philips Corporation. Processor 410 provides support for audio-visual information, graphic information, a network stack, and a user interface, and is configured to carry out the steps described below in reference to FIG. 7.

Attached to processor 410 is an analog input 490 and a digital input 440. Input 490 may receive television broadcast information from, for example, a television antenna or a cable television system. Accordingly, input 490 supports standards such as National Television Standards Committee (NTSC). Input 440 may receive information from, for example, digital cable television systems or digital satellite systems. Accordingly, input 440 supports standards such as Quadrature Amplitude Modulation for digital cable and Quadrature Phase Shift Keying for digital satellite systems.

Also attached to processor 410 is an output interface 430 for sending video data from interactive receiver 300 to, for example, a VCR, a digital video drive, or a video printer. In addition to output interface 430, there is attached to processor 410 a display screen 480 for displaying audio-visual and text information to the user. Examples of display screen 480 include a cathode ray tube, a liquid crystal display, or a plasma display.

Also attached to processor 410 is a remote input interface 450 for receiving commands, such as infrared or radio frequency signals, from remote control device 320. In addition, an audio input interface 455 is attached to processor 410, which enables the user to add audio to text or graphic images. Interactive receiver 300 also contains an external interface 425 for communicating with external devices such as offline storage device 315. Examples of external interface 425 include, but are not limited to, the Small Computer System Interface (SCSI), IEEE 1394, and Electronics Industry Association Recommended Standard 232. A memory device 420 is attached to processor 410 for storing information. Examples of memory device 420 include, but are not limited to, a hard disk, a random access memory, a flash memory, or a floppy disk.

Also shown in this example is a communication device 460, which represents any device capable of communicating electronic information between multimedia processor 410 and ISP 330. Device 460 may operate over telephone lines using conventional standards such as V.34 or Integrated Services Digital Network (ISDN). Alternatively, device 460 may be a cable modem operating over coaxial cable.

Although FIG. 4 shows one example of an interactive receiver, those skilled in the art will recognize that there exist other devices that are also consistent with the claimed invention. For example, the components shown in FIG. 4 may be integrated into a digital television receiver cabinet. Alternatively, some of the components may be integrated into a television receiver cabinet while others remain externally attached.

Figure 5:
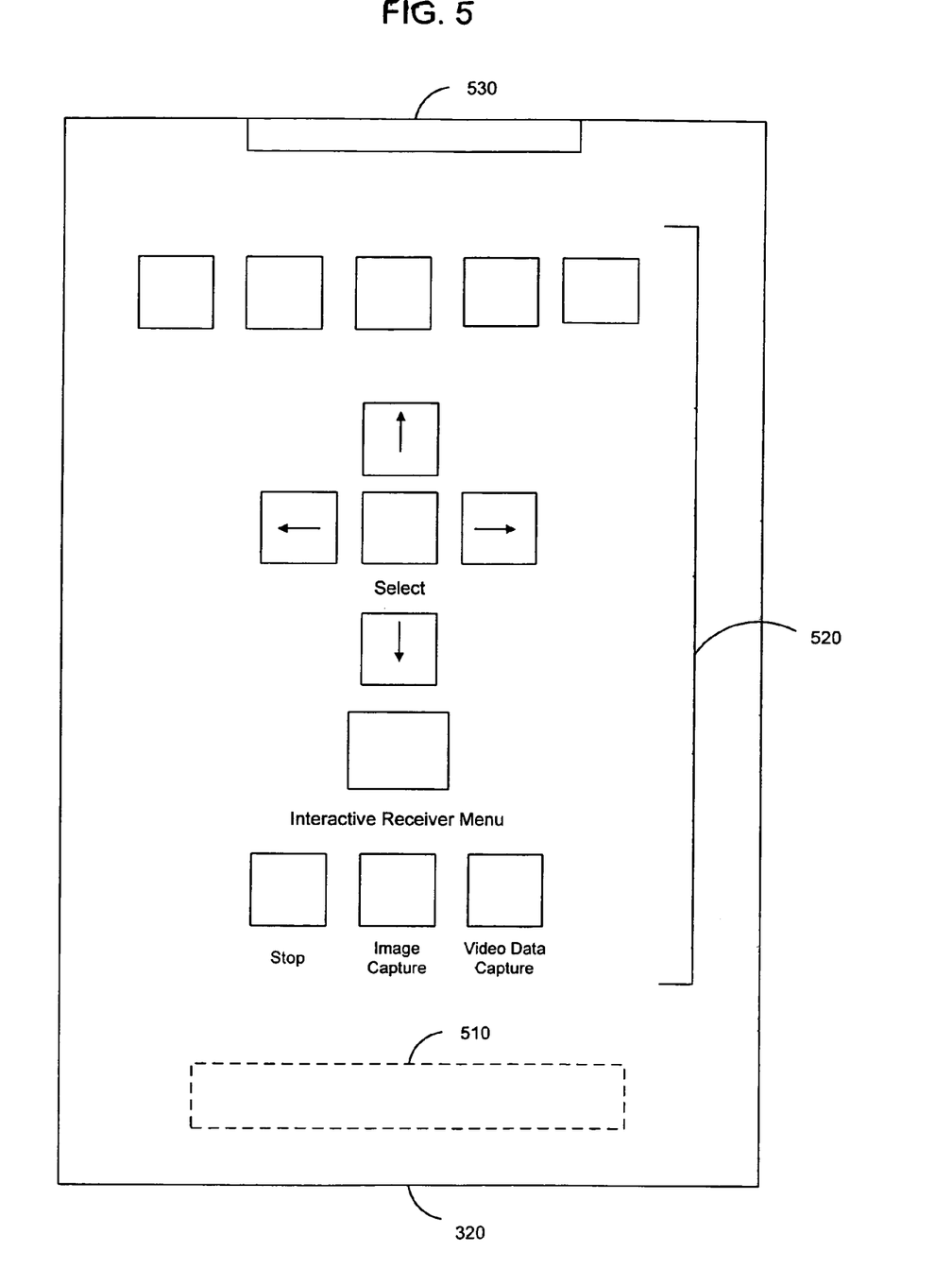
FIG. 5 is a diagram of a remote control device that may be used in conjunction with the claimed invention.

FIG. 5 shows a diagram of a remote control device that may be used in conjunction with the claimed invention. Remote control device 320 is powered by batteries 510 contained within the device. Remote control device 320 also contains numerous user control keys 520. In addition to providing routine television control, such as changing television channels or volume levels, remote control device 320 also contains keys for displaying a menu, cursor control keys for selecting menu items, and keys for initiating and ending the capture of video data. These are shown in FIG. 5 as: an "Interactive Receiver Menu" key, which is used to display a menu; arrow and "Select" keys for manipulating menu items; an "Image Capture" key for initiating a graphic image capture; a "Video Data Capture" key for initiating a video sequence capture; and a "Stop" key for ending the capture of video data. Remote control device 320 also contains an infrared transmitter 530 for conveying commands from remote control device 320 to interactive receiver 300. The channel of communication between remote control device 320 and interactive receiver 300 is not critical. In addition to infrared signals, one may use any other conventional technique such as RF signals or a physical cable.

Although FIG. 5 shows one example of a remote control device, those skilled in the art will recognize that there exist other remote control devices that are also consistent with the claimed invention. For example, remote control device 320 could be a conventional QWERTY keyboard.

Figure 6:
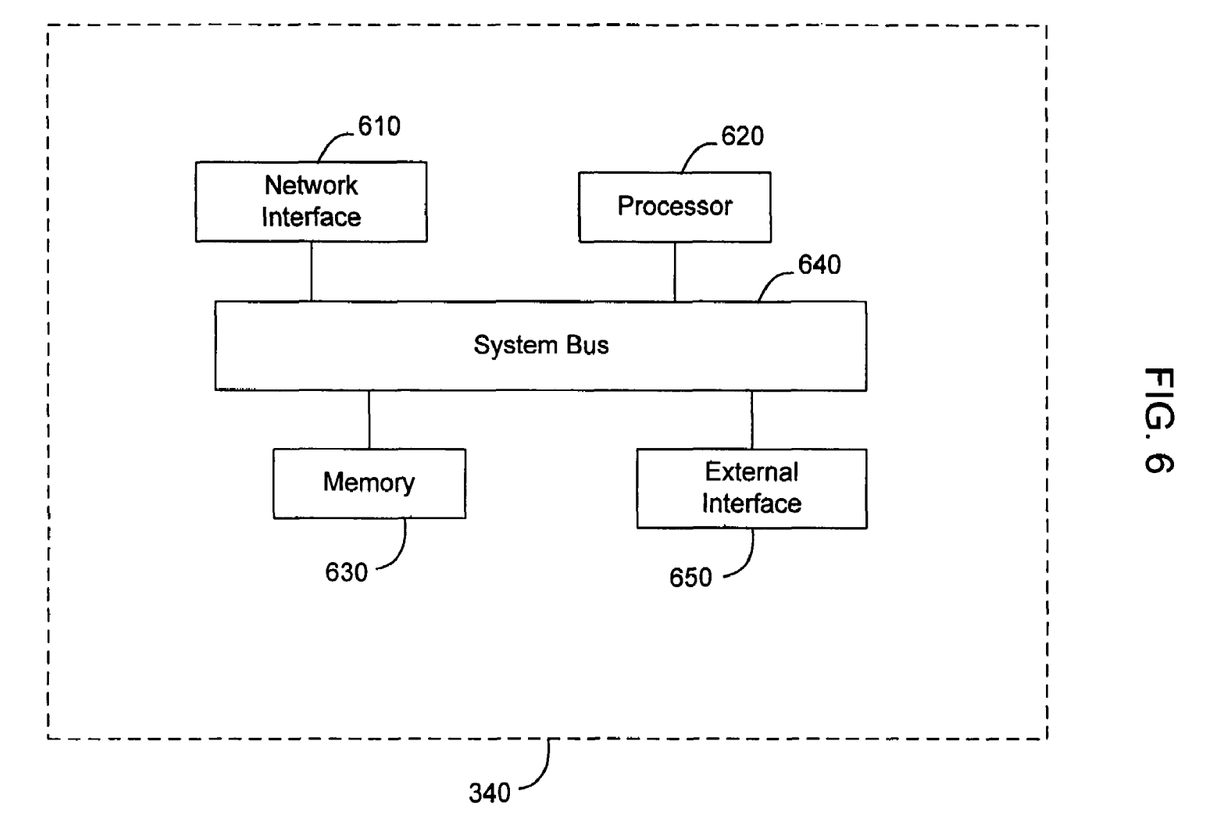
FIG. 6 is a block diagram, consistent with the claimed invention, of a mail server.

FIG. 6 is a block diagram, consistent with the claimed invention, of server 340. Server 340 includes multiple components that are all interconnected by a system bus 640. The system bus 640 may be a conventional PCI bus, such as those used in personal computers. Attached to system bus 640 is a processor 620, such as the Intel Pentium MMX processor. Processor 620 may be configured via software to perform the tasks (described below in reference to FIG. 7) necessary to provide a prioritized email system. Also attached to system bus 640 is a network interface 610. Examples of such an interface include an RS-232 connector for serial data, a modular telephone jack for dial-up connections, or a BNC connector for Ethernet networks. Server 340 also includes a memory 630, such as a random access memory. The diagram also depicts external interface 650, which may be an SCSI interface, and which allows server 340 to interface with other external devices such as storage device 350 (FIG. 3).

A user of a system consistent with the claimed invention purchases an interactive receiver, such as interactive receiver 300. Interactive receiver 300 supports one master account for each home, the master account having multiple user sub-accounts. A user connects interactive receiver 300 to an alternating current power source, and connects modem 460 to a standard telephone line.

C. Flow Diagrams

Figure 7:
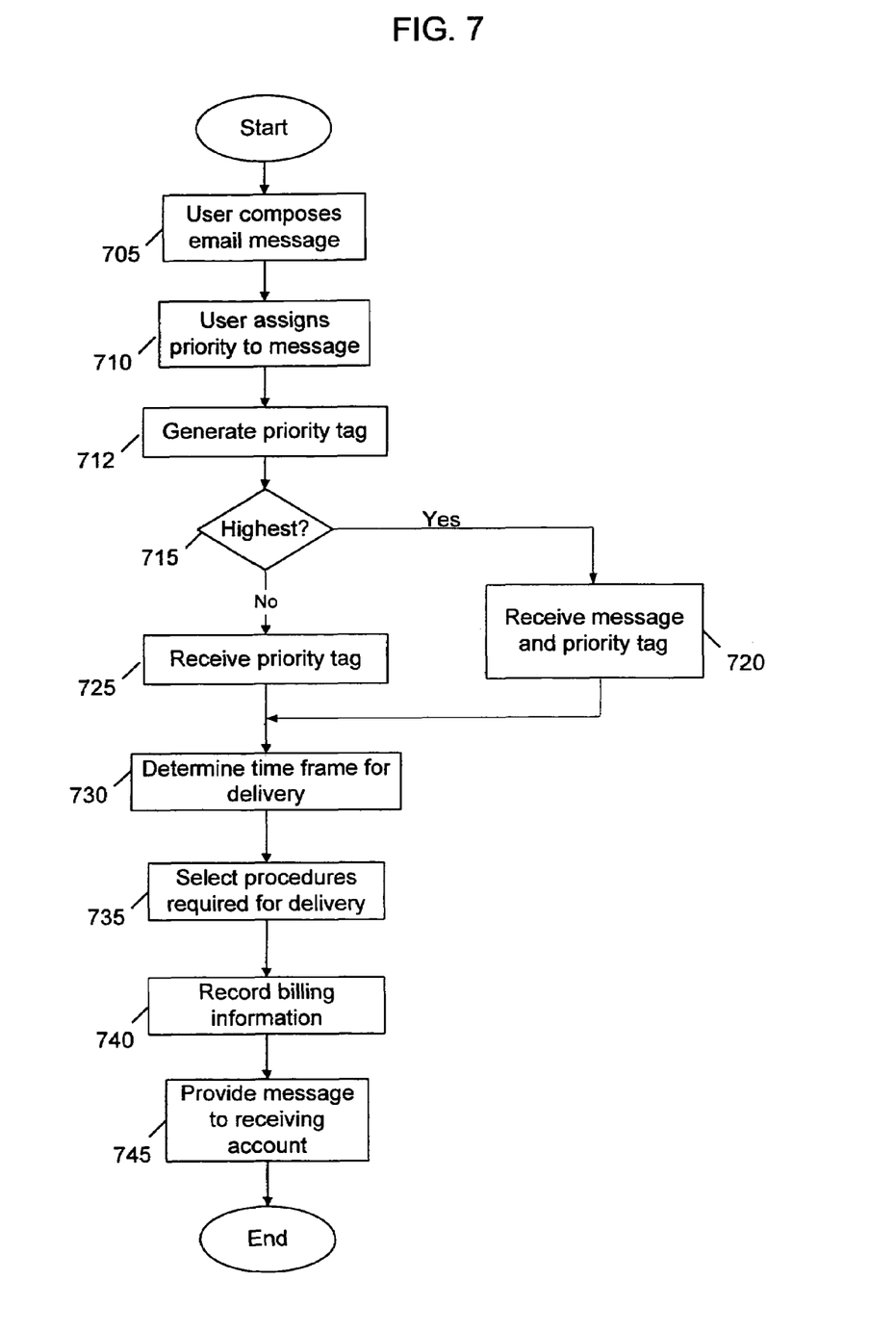
FIG. 7 is a flow diagram, consistent with the claimed invention, of the steps performed to employ a priority delivery email system.

FIG. 7 is a flow diagram, consistent with the claimed invention, of stages performed to employ one prioritized email message system that is consistent with the invention. After the process begins, a user at the sending account composes an email message on interactive receiver 300 (stage 705). The user may compose such an email message by using a conventional keyboard connected to either external interface 425 or remote input 450. After composing the message, the user assigns a priority level to the message or specifies a time frame within which the message is to be delivered (stage 710), and a priority tag associated with the message is generated (stage 712). The priority tag preferably consists of one or more data packets that contain some indication of a delivery time frame (i.e., the time by which the email message is to be provided to the receiving account) and an identification code that associates the priority tag with the email message. Although the priority tag is preferably separate from the email message, other forms of tagging priority may be used consistent with the invention, such as including the priority tag with the email message.

If the priority level is the highest possible (or if the time frame is the shortest possible) (stage 715), preferably both the email message and the associated priority tag are transmitted to server 340 using the fastest path between interactive receiver 300 and server 340 (stage 720). For any lower priority level (or longer time frame), preferably only the priority tag is transmitted to server 340 using the fastest path between interactive receiver 300 and server 340 (stage 725).

After receiving the priority tag (with or without its associated email message), server 340 determines a time frame for delivery of the message (stage 730). If the email message contains a specified time frame, the determined time frame equals the specified time frame. If the email message contains a priority level rather than a specified time frame, the determined time frame corresponds to predetermined time frames that are associated with each priority level. For example, the predetermined time frame for a high priority message may be five minutes, whereas the predetermined time frame for a low priority message may be twelve hours.

Server 340 then selects procedures to ensure delivery of the email message within the determined time frame (stage 735). If the email message is of the highest priority (or shortest time frame), server 340 preferably processes the email message immediately and transmits the email message to the receiving account using the fastest data path between server 340 and the receiving account. If the email message is of a lower priority (or longer time frame), server 340 coordinates timely delivery based on numerous factors, including the following: the priority level of the message, the types of data paths between interactive receiver 300 and server 340, the activity level at server 340, or the types of data paths between server 340 and the receiving accounts.

Server 340 records billing information based on the priority level (or time frame) of the message and associates that billing information with either the sending account or the receiving account (stage 740). Server 340 then employs the selected procedures to provide the email message to the receiving account (stage 745).

D. Conclusion

Methods and apparatus consistent with the invention provide prioritized email messages, which allow users to specify delivery time frames—either directly via specified time frames or indirectly via priority levels. Methods and apparatus consistent with the present invention may be implemented in software, hardware, or a combination of hardware and software. Software implementations of the invention are preferably embodied in computer-readable media, such as magnetic disks, or transferred over computer-readable media, such as the Internet. It will be apparent to those skilled in the art that various modifications and variations can be made in the methods and systems consistent with the present invention without departing from the spirit or scope of the invention. For example, although the description above is based on priority levels or specified time frames, those skilled in the art will recognize that there exist other ways to designate delivery time frames. Similarly, although the description above is based on priority tags that are transmitted to a server, those skilled in the art will recognize that priority tags are not required and that a priority level may be included with an email message instead. Furthermore, rather than serving as a conduit for email messages, the server may coordinate direct transmission of the email message between the sending account and the receiving account.

What is claimed is:

1. A method for providing prioritized delivery of an email message, comprising:
   receiving the email message;
   receiving a corresponding delivery time frame for the email message, wherein the corresponding delivery time frame is specified by a sender of the email message;
   selecting procedures sufficient for delivering the email message within the specified time frame; and
   delivering the email message within the specified time frame using the selected procedures.

2. The method of claim 1, further comprising receiving a priority tag associated with the email message.

3. The method of claim 1, wherein receiving a corresponding delivery time frame for the email message comprises receiving an email message that contains a priority level, and wherein the email message is delivered within the time frame associated with the email message based on the priority level.

4. The method of claim 1, further comprising recording billing information for the email message.

5. The method of claim 4, wherein the billing information is based on the selected procedures.

6. The method of claim 1, further comprising:
   recording billing information having an associated billing rate for delivery of the email message, the billing rate being based on the selected procedures.

7. In a system for sending and receiving email using an interactive receiver and having at least one sending account and at least one receiving account, a method for providing prioritized delivery, comprising:
   receiving from a sending account of the at least one sending account at a mail server an email message;
   receiving a corresponding delivery time frame for the email message, wherein the corresponding delivery time frame is specified by a sender of the email message;
   selecting procedures to ensure that the email message can be delivered to the receiving account within the specified time frame; and
   delivering the email message within the specified time frame using the selected procedures.

8. The method of claim 7, wherein receiving a corresponding delivery time frame comprises receiving a priority level associated with the email message; and wherein the email message is delivered within the time frame associated with the email message based on the priority level.

9. The method of claim 7, wherein selecting procedures to ensure that the email message can be delivered to the receiving account within the specified time frame comprises:
   selecting at least one data path that has sufficient bandwidth to ensure delivery of the email message within the specified time frame.

10. The method of claim 7, further comprising:
    recording billing information having an associated billing rate for delivery of the email message, the billing rate being based on the selected procedures.

11. An apparatus for providing prioritized delivery of an email message, comprising:
at least one memory having program instructions; and
at least one processor configured to execute the program instructions to perform the operations of:
receiving the email message;
receiving a corresponding delivery time frame for the email message, wherein the corresponding delivery time frame is specified by a sender of the email message;
selecting procedures sufficient for delivering the email message within the specified time frame; and
delivering the email message within the specified time frame using the selected procedures.

12. The apparatus of claim 11, wherein the at least one processor is further configured to execute the program instructions to perform the operations of:
recording billing information having an associated billing rate for delivery of the email message, the billing rate being based on the selected procedures.

13. An apparatus for providing prioritized delivery of an email message from a sending account to a receive account, comprising:
at least one memory having program instructions; and
at least one processor configured to execute the program instructions to perform the operations of:
receiving from the sending account at a mail server the email message;
receiving a corresponding delivery time frame for the email message, wherein the corresponding delivery time frame is specified by a sender of the email message;
selecting procedures to ensure that the email message can be delivered to the receiving account within the specified time frame; and
delivering the email message within the specified time frame using the selected procedures.

14. The apparatus of claim 13, wherein the at least one processor is further configured to execute the program instructions to perform the operations of:
recording billing information having an associated billing rate for delivery of the email message, the billing rate being based on the selected procedures.

15. A computer-readable medium containing instructions for controlling a computer system to perform a method for providing prioritized delivery of an email message, the method comprising:
receiving the email message;
receiving a corresponding delivery time frame for the email message, wherein the corresponding delivery time frame is specified by a sender of the email message;
selecting procedures sufficient for delivering the email message within the specified time frame; and
delivering the email message within the specified time frame using the selected procedures.

16. The computer-readable medium of claim 15, the computer-readable medium containing instructions for controlling a computer system to perform a method for providing prioritized delivery of an email message, the method further comprising:
recording billing information having an associated billing rate for delivery of the email message, the billing rate being based on the selected procedures.

17. A computer-readable medium containing instructions for controlling a computer system to perform a method for providing prioritized delivery of an email message from a sending account to a receiving account, the method comprising:
receiving from the sending account at a mail server the email message;
receiving a corresponding delivery time frame for the email message, wherein the corresponding delivery time frame is specified by a sender of the email message;
selecting procedures to ensure that the email message can be delivered to the receiving account within the specified time frame; and
delivering the email message within the specified time frame using the selected procedures.

18. The computer-readable medium of claim 17, the computer-readable medium containing instructions for controlling a computer system to perform a method for providing prioritized delivery of an email message, the method further comprising:
recording billing information having an associated billing rate for delivery of the email message, the billing rate being based on the selected procedures.

19. An apparatus for providing prioritized delivery of an email message, comprising:
means for receiving the email message;
means for receiving a corresponding delivery time frame for the email message, wherein the corresponding delivery time frame is specified by a sender of the email message;
means for selecting procedures sufficient for delivering the email message within the specified time frame; and
means for delivering the email message within the specified time frame using the selected procedures.

20. The apparatus of claim 19, further comprising:
means for recording billing information having an associated billing rate for delivery of the email message, the billing rate being based on the selected procedures.

* * * * *

UNITED STATES PATENT AND TRADEMARK OFFICE
CERTIFICATE OF CORRECTION

PATENT NO. : 7,490,129 B2  Page 1 of 1
APPLICATION NO. : 10/988276
DATED : February 10, 2009
INVENTOR(S) : David Shan Ming-Wang et al.

It is certified that error appears in the above-identified patent and that said Letters Patent is hereby corrected as shown below:

At col. 9, line 21:

"email message from a sending account to a receive account,"

should read

--email message from a sending account to a receiving account,--

Signed and Sealed this

Eighteenth Day of August, 2009

David J. Kappos
*Director of the United States Patent and Trademark Office*